United States Patent
Tamagawa

(10) Patent No.: US 9,998,913 B2
(45) Date of Patent: Jun. 12, 2018

(54) MANAGEMENT METHOD AND MANAGEMENT SERVER FOR USING SIM CARDS

(71) Applicant: SORACOM, INC., Setagaya-ku (JP)

(72) Inventor: Ken Tamagawa, Tokyo (JP)

(73) Assignee: SORACOM, INC., Tokyo (JP)

( * ) Notice: Subject to any disclaimer, the term of this patent is extended or adjusted under 35 U.S.C. 154(b) by 0 days. days.

(21) Appl. No.: 15/691,198

(22) Filed: Aug. 30, 2017

(65) Prior Publication Data

US 2017/0366963 A1  Dec. 21, 2017

Related U.S. Application Data

(63) Continuation of application No. 15/320,832, filed as application No. PCT/JP2016/067292 on Jun. 9, 2016.

(30) Foreign Application Priority Data

Jun. 10, 2015 (JP) ................................. 2015-117661
Jul. 30, 2015 (JP) ................................. 2015-150496

(51) Int. Cl.
  *H04W 8/18* (2009.01)
  *H04W 60/00* (2009.01)

(52) U.S. Cl.
  CPC ........... *H04W 8/183* (2013.01); *H04W 60/00* (2013.01)

(58) Field of Classification Search
  CPC ............................ H04W 8/183; H04W 60/00
  See application file for complete search history.

(56) References Cited

U.S. PATENT DOCUMENTS

2010/0210304 A1* 8/2010 Huslak ................... G06Q 10/10
                                                                455/558
2011/0164511 A1  7/2011 Poon et al.
(Continued)

FOREIGN PATENT DOCUMENTS

EP        2843885      8/2013
JP        2003-50972   2/2003
(Continued)

OTHER PUBLICATIONS

Docomo M2M Platform Docomo Business Online NTT Docomo, NTT Docomo Inc., Mar. 21, 2015 with English translation http://web.archive.org/web/20150321074721/http://www.docomo.biz/html/m2m/solution/m2mplatform/.

(Continued)

Primary Examiner — Khai M Nguyen
(74) Attorney, Agent, or Firm — Cozen O'Connor

(57) ABSTRACT

In a management method and a management server for using a plurality of SIM cards, a large number of users can start use easily. First, an MVNO 230A that has obtained one or more SIM cards logs in to a management screen provided by an MVNE 210 in association with a user ID of the MVNO 230A. From the standpoint of the MVNE 210, it is determined whether a user ID of a user who has accessed a management screen of a management server of the MVNE 210 is under MVNO contract (S301). When the user ID is under MVNO contract, an identification number given to each SIM card and a passcode for authentication given as needed are received as registration information (S302). If the management server of the MVNE 210 can receive necessary registration information, each SIM card of which an identification number is specified by the registration information is associated with the user ID as an SIM card used by the MVNO 230A and the association is registered in the man- (Continued)

agement server of the MVNE 210 or a database 211 accessible therefrom (S303).

9 Claims, 9 Drawing Sheets

(56) References Cited

U.S. PATENT DOCUMENTS

| | | |
|---|---|---|
| 2012/0030280 A1 | 2/2012 | Wang et al. |
| 2012/0203905 A1 | 8/2012 | Lee |
| 2012/0309374 A1 | 12/2012 | Tagg |
| 2013/0054761 A1 | 2/2013 | Kempf et al. |
| 2013/0142201 A1 | 6/2013 | Kim et al. |
| 2013/0225130 A1 | 8/2013 | Rost et al. |
| 2013/0318527 A1 | 11/2013 | Tamura |
| 2014/0254373 A1 | 9/2014 | Varma |
| 2015/0004967 A1 | 1/2015 | Jiang |
| 2015/0109995 A1 | 4/2015 | Mathai et al. |
| 2015/0381763 A1 | 12/2015 | Moon et al. |
| 2016/0007188 A1 | 1/2016 | Wane |
| 2016/0014579 A1* | 1/2016 | Kasilya Sudarsan ... H04W 4/16 455/417 |
| 2017/0150435 A1 | 5/2017 | Tagg |
| 2017/0201876 A1* | 7/2017 | Tamagawa ............ H04W 8/183 |

FOREIGN PATENT DOCUMENTS

| | | |
|---|---|---|
| JP | 2013-041397 | 2/2013 |
| JP | 2013-516907 | 5/2013 |
| JP | 2013-126188 | 6/2013 |
| JP | 2013-539623 | 10/2013 |
| JP | 2014-512718 | 5/2014 |
| JP | 2014-155136 | 8/2014 |
| JP | 2014-158190 | 8/2014 |
| JP | 2014-531792 | 11/2014 |
| JP | 2015-505431 | 2/2015 |
| JP | 2015-50537 | 3/2015 |
| JP | 2015-5050772 | 3/2015 |
| JP | 2015-100028 | 5/2015 |
| WO | WO 2007/052348 | 5/2007 |
| WO | WO 2012/160465 | 11/2012 |
| WO | WO 2013/144747 | 10/2013 |
| WO | WO2014/146999 | 9/2014 |

OTHER PUBLICATIONS

White Paper, Next Generation Intel® Xeon® Processors, Networking and Telecommunication Industries, "Developing a Wireless Communications Cloud with Intel® Architecture", pp. 1-6, www.intel.com/go/commsinfrastructure.

* cited by examiner

FIG.5

SIM REGISTRATION

IMSI (DIGIT)*

| IMSI |

PASSWORD (FIVE DIGITS)*

| PASSWORD |

NAME

| NAME |

GROUP

| GROUP |

CANCEL  REGISTER

FIG.8

| IMSI | MSISDN | NAME | GROUP | STATUS | SIM TYPE | EXPIRATION DATE | | |
|---|---|---|---|---|---|---|---|---|
| ☐ 4094999876557316 | | SAMPLE 4 | TEST GROUP 1 | CANCELLED | h1.medium | 2015/6/5 CHANGE | | DELETE |
| ☐ 4094999876557926 | | SAMPLE 93 | TEST GROUP 1 | ● IN-USE | s1.small | 2015/7/5 CHANGE | SESSION DISCONNECTION | DELETE |
| ☐ 4094999876558915 | | SAMPLE 2 | TEST GROUP 1 | ● IN-USE | h1.2xlarge | 2015/7/5 CHANGE | SESSION DISCONNECTION | DELETE |
| ☐ 4094999876559140 | | SAMPLE 76 | TEST GROUP 1 | ● IN-USE | s1.small | 2015/7/5 CHANGE | SESSION DISCONNECTION | DELETE |
| ☐ 4094999876560868 | | SAMPLE 99 | TEST GROUP 1 | ● IN-USE | s1.small | 2015/7/5 CHANGE | SESSION DISCONNECTION | DELETE |

FIG.9

USER CONSOLE | SIM MANAGEMENT | SUPPORT | user1@xxxx.jp

| IMSI | MSISDN | NAME | GROUP | STATUS | | EXPIRATION DATE |
|---|---|---|---|---|---|---|
| 4094999987654600 | | SAMPLE 82 | TEST GROUP 2 | CANCELLED | um | 2015/5/16 |
| 4094999987654842 | | SAMPLE 24 | TEST GROUP 2 | INACTIVE | um | 2015/5/22 |
| 4094999987656263 | | SAMPLE 45 | TEST GROUP 2 | INACTIVE | h1.xlarge | 2015/6/5 |
| 4094999987656302 | | SAMPLE 37 | TEST GROUP 2 | IN-USE | s1.small | 2015/7/5 |
| 4094999987657316 | | SAMPLE 4 | TEST GROUP 1 | CANCELLED | h1.medium | 2015/6/5 |
| 4094999987657926 | | SAMPLE 93 | TEST GROUP 1 | IN-USE | s1.medium | 2015/7/5 |
| 4094999987659140 | | SAMPLE 76 | TEST GROUP 1 | IN-USE | s1.medium | 2015/7/5 |
| 4094999987660868 | | SAMPLE 99 | TEST GROUP 1 | IN-USE | h1.large | 2015/6/5 |
| 4094999987663285 | | SAMPLE 75 | TEST GROUP 2 | CANCELLED | s1.small | 2015/6/5 |
| 4094999987664088 | | SAMPLE 44 | TEST GROUP 2 | IN-USE | s1.small | 2015/7/5 |

Popup 900: IMSI / MSISDN / NAME / GROUP

MANAGEMENT METHOD AND MANAGEMENT SERVER FOR USING SIM CARDS

RELATED APPLICATIONS

This application is a Continuation of U.S. application Ser. No. 15/320,832 filed Dec. 21, 2016 which is a U.S. National Stage Application under 35 USC § 371 of International application No. PCT/JP2016/067292 filed Jun. 9, 2016, which claims priority of Japanese patent application nos. 2015-117661 filed Jun. 10, 2015 and 2015-150496 filed Jul. 30, 2015, the entire contents of all of which are hereby incorporated by reference.

BACKGROUND OF THE INVENTION

Recently, with the advent of a mobile virtual network operator (MVNO), retailing of a wireless communication line is becoming popular. Conventionally, a mobile network operator (MNO) having a wireless communication infrastructure provided a wireless communication service to an end user directly. However, MVNOs provide original wireless communication services to the end user using the wireless communication infrastructure of an MNO.

MVNOs can be roughly classified into a form where a company does not have an in-house communication infrastructure and a form where a company itself has an in-house communication infrastructure and the communication infrastructure is connected to the communication infrastructure of an MNO to provide a wireless communication service (see FIG. 1). As compared with the case of the former, in the case of the latter, because the company has the in-house communication infrastructure and price setting according to communication quality such as communication speed and communication capacity is enabled, attempts to meet various needs are made. For example, SIM cards for a wireless communication service of which the price is suppressed by setting maximum communication capacity that allows high-speed data communication are sold in mass merchandisers.

Specifically, such an MVNO receives SIM cards from an MNO and provides the SIM cards to the end users. The MVNO manages communication quality such as speed limit and capacity limit set to each SIM card together with the identification number of each SIM card by a database and provides a wireless communication service according to the contract details for a portable terminal such as a smart phone and a tablet requesting an access to the Internet.

Also, there is a case in which a mobile virtual network enabler (MVNE) providing a support service to enable MVNOs to run a business smoothly intervenes between an MNO and an MVNO and the MVNE receives SIM cards from the MNO and provides the SIM cards to the MVNO.

When the MVNO or the MVNE holds a gateway (GGSN in 3G and P-GW in LTE) as an end point of a core network as an in-house communication infrastructure, L2 connection (full MVNO connection (S5/S8 interface in LTE and Gn interface in 3G)) with a communication infrastructure (SGSN in 3G and S-GW in LTE) of an MNO is enabled and an L2 tunnel is formed between a wireless terminal on which a SIM card of an end user is mounted and the gateway. Because the L2 connection has higher freedom in designing of a wireless communication service than L3 connection (light MVNO connection), the L2 connection is attracting attention.

A movement of IoT to connect all things to the Internet by adding wireless communication functions is the example of recent remarkable increase in the needs for wireless communication service. Hereinafter, a wireless apparatus that can be connected to a computer network including the Internet is called an "IoT apparatus".

The IoT apparatus also includes a portable terminal such as a smart phone and a tablet held by a person. However, the IoT apparatus is expanding to apparatuses requiring communication of a form different from a communication form for a person, like a transportation means such as an automobile moving faster than a person and a sensor rarely moving from a specific position. For this reason, the required communication speed or communication frequency is various. It may be said that optimal communication quality is changing. For example, in the case in which it is considered that SIM cards are incorporated into 10 or 100 industrial machines to realize IoT and the industrial machines are remotely caused to perform communication with other apparatuses, installation of a large number of SIM cards is required even if each IoT apparatus performs communication of low capacity at a low frequency.

With the spread of IoT apparatuses, the number of users such as providers managing a plurality of IoT apparatuses increases, but on the other hand it is difficult under the present conditions for each user to make a contract with an MNO as an MVNO and collectively manage the plurality of IoT apparatuses, that is, a plurality of SIM cards mounted on the plurality of IoT apparatuses. First, the needs diversify together with the spread of IoT apparatuses and a situation where a small number of SIM cards such as several to several tens of SIM cards are used, like the case of making apparatuses IoT apparatuses on a trial basis, can be envisioned. When the user desires to manage the SIM cards collectively, instead of using the SIM cards through individual contracts, an MVNO contract with an MNO is necessary. However, there are many cases in that the small-scale MVNO cannot make a contract with the MNO to begin with. Then, even if the user can make a contract with an MNO as a small-scale MVNO, to increase SIM cards by several to several tens of pieces, the MVNO needs to make a request to the MNO to associate the additional SIM cards with the ID of the MVNO(hereinafter, referred to as an "user ID"). After completion of the association, the MVNO receives the additional SIM cards and these become available for use. Specifically, as an association, a name of the MVNO, an identification number of each SIM card such as IMSI and ICCID, status such as in-use and inactive, etc. are input to each SIM card manually by a dedicated device and are registered in a database of the MNO. A series of procedures accompanying the circulation of SIM cards to an MVNO are complicated and requires several weeks. In addition, initial investment is necessary from economic point of view and it is not possible to meet the needs of a user who desires to use necessary number of SIM cards necessary for IoT apparatuses as needed.

An environment where a large number of users can become MVNOs easily is strongly required while it is anticipated that the number of small-scale and medium-scale MVNOs increases rapidly.

SUMMARY OF THE INVENTION

The present invention has been made in view of the above problem and an objective thereof is to enable a large number of users to start usage easily, in a management method and a management server for using a plurality of SIM cards.

To achieve this objective, the aspect 1 of the present invention is a management method for using a plurality of SIM cards, comprising steps of: receiving registration information for registering one or more SIM cards; and associating one or more SIM cards, one or more identification numbers of which are specified by the received registration information, with a user ID of a user of the plurality of SIM cards.

The aspect 2 of the present invention is the management method according to aspect 1, wherein management of communication status of the associated one or more SIM cards are started as inactive.

The aspect 3 of the present invention is the management method according to aspect 2, wherein the communication status is changeable on a management screen provided for the user ID.

The aspect 4 of the present invention is the management method according to aspect 3, wherein the communication status is changeable by selecting from at least more than two of inactive, in-use, cancelled, and dispatching.

The aspect 5 of the present invention is the management method according to aspect 3 or 4, wherein communication quality of each SIM card is changeable on the management screen.

The aspect 6 of the present invention is the management method according to aspect 5, wherein the communication quality is at least one of speed limit, capacity limit and time slot limit.

The aspect 7 of the present invention is the management method according to aspect 5 or 6, wherein management of the communication status or the communication quality is performed on a instance on a cloud.

The aspect 8 of the present invention is the management method according to any one of aspects 1 to 7, comprising the steps of: receiving a change application of a user of one or more SIM cards associated with the user ID; and generating registration information for one or more SIM cards which are targeted by the change application in response to the change application.

The aspect 9 of the present invention is the management method according to aspect 8, wherein communication status of one or more SIM cards which are targeted by the change application is changed in response to receiving the change application.

The aspect 10 of the present invention is the management method according to any one of aspects 1 to 9, wherein the registration information includes one or more identification numbers of the one or more SIM cards; wherein the step of receiving the registration information comprises the steps of detecting a click or tap of a registration button on a management screen provided for the user ID; displaying an input screen for registering the one or more SIM cards in response to detection; and associating the one or more SIM cards, one or more identification numbers of which are input on the input screen, with the user ID.

The aspect 11 of the present invention is the management method according to any one of aspects 1 to 9, wherein the registration information includes a group ID allocated to the one or more SIM cards as a set of SIM cards, comprising a step of specifying one or more identification numbers of the one or more SIM cards by referring to a correspondence table between the group ID obtained from the received registration information and the one or more SIM cards to which the group ID is allocated.

The aspect 12 of the present invention is the management method according to aspect 11, wherein the registration number includes a passcode corresponding to the group ID.

The aspect 13 of the present invention is the management method according to aspect 11 or 12, further comprising steps of: generating a registration code corresponding to the registration information; and sending the registration code to a terminal of the user.

The aspect 14 of the present invention is the management method according to any one of aspects 11 to 13, wherein association of the one or more SIM cards with the user ID is performed without requiring an additional input from the user after obtaining the group ID.

The aspect 15 of the present invention is the management method according to any one of aspects 11 to 13, further comprising a step of displaying an input screen for designating a group name of the one or more SIM cards to be associated with the user ID after obtaining the group ID; wherein the registration information further includes the group name.

The aspect 16 of the present invention is the management method of aspect 14 or 15, wherein a SIM card associated with the user ID is displayed on a management screen provided for the user ID after the association.

The aspect 17 of the present invention is a program for having a computer to perform a management method for using a plurality of SIM cards, the management method comprising steps of: receiving registration information for registering one or more SIM cards; and associating one or more SIM cards, one or more identification numbers of which are specified by the received registration information, with a user ID of a user of the plurality of SIM cards.

The aspect 18 of the present invention is a management server for using a plurality of SIM cards, comprising: a receiving unit for receiving registration information for registering one or more SIM cards; and a registering unit for associating and registering one or more SIM cards, one or more identification numbers of which are specified by the received registration information, with a user ID of a user of the plurality of SIM cards.

Conventionally, SIM cards cannot be supplied to an MVNO unless the MVNO goes through a series of complicated procedures with an MNO. According to an embodiment of the present invention utilizing a user ID, the MVNO to which SIM cards are provided can associate the SIM cards with its user ID afterwards. Therefore, SIM cards can be circulated in a state without association with a user ID of an MVNO and a large number of MVNOs can start to use a plurality of SIM cards easily.

Another aspect of the present invention is directed to a management method for using a plurality of SIM cards, comprising steps of: receiving registration information for registering one or more SIM cards; and associating one or more SIM cards, one or more identification numbers of which are specified by the received registration information, with a user ID of a user of the plurality of SIM cards, wherein communication status for each identification number is changeable on a management screen provided for the user ID, and wherein communication quality for each identification number is changeable on the management screen.

Another asepct of the present invention is directed to a program storage medium, readable by a computer, storing a program for having a computer to perform a management method for using a plurality of SIM cards, the management method comprising steps of: receiving registration information for registering one or more SIM cards; and associating one or more SIM cards, one or more identification numbers of which are specified by the received registration information, with an user ID of an user of the plurality of SIM cards, wherein communication status for each identification number is changeable on a management screen provided for the user ID, and wherein communication quality for each identification number is changeable on the management screen.

Another asepct of the present invention is directed to management server for using a plurality of SIM cards, comprising: a receiving unit for receiving registration information for registering one or more SIM cards; and an associating unit for associating one or more SIM cards, one or more identification numbers of which are specified by the received registration information, with an user ID of an user of the plurality of SIM cards, wherein communication status for each identification number is changeable on a management screen provided for the user ID, and wherein communication quality for each identification number is changeable on the management screen.

BRIEF DESCRIPTION OF THE DRAWINGS

FIG. 5 is a diagram illustrating a registration screen of a SIM card according to an embodiment of the present invention.

FIG. 8 is a diagram illustrating a management screen of a plurality of SIM cards according to an embodiment of the present invention.

FIG. 9 is a diagram illustrating a method of a group selection of a plurality of SIM cards according to an embodiment of the present invention.

DETAILED DESCRIPTION OF THE DRAWINGS

Hereinafter, embodiments of the present invention will be described with reference to the drawings.

In the present specification, a user who manages and uses a plurality of SIM cards collectively may be called an "MVNO".

In addition, definitions of terms such as an MNO and an MVNE may be different by countries. In the present specification, as in Japan, the case in which an MNO holds SGSN of 3G or S-GW of LTE as a communication infrastructure and an MVNE holds GGSN of 3G or P-GW of LTE as a communication infrastructure will be described as an example.

First Embodiment

Figure 1:
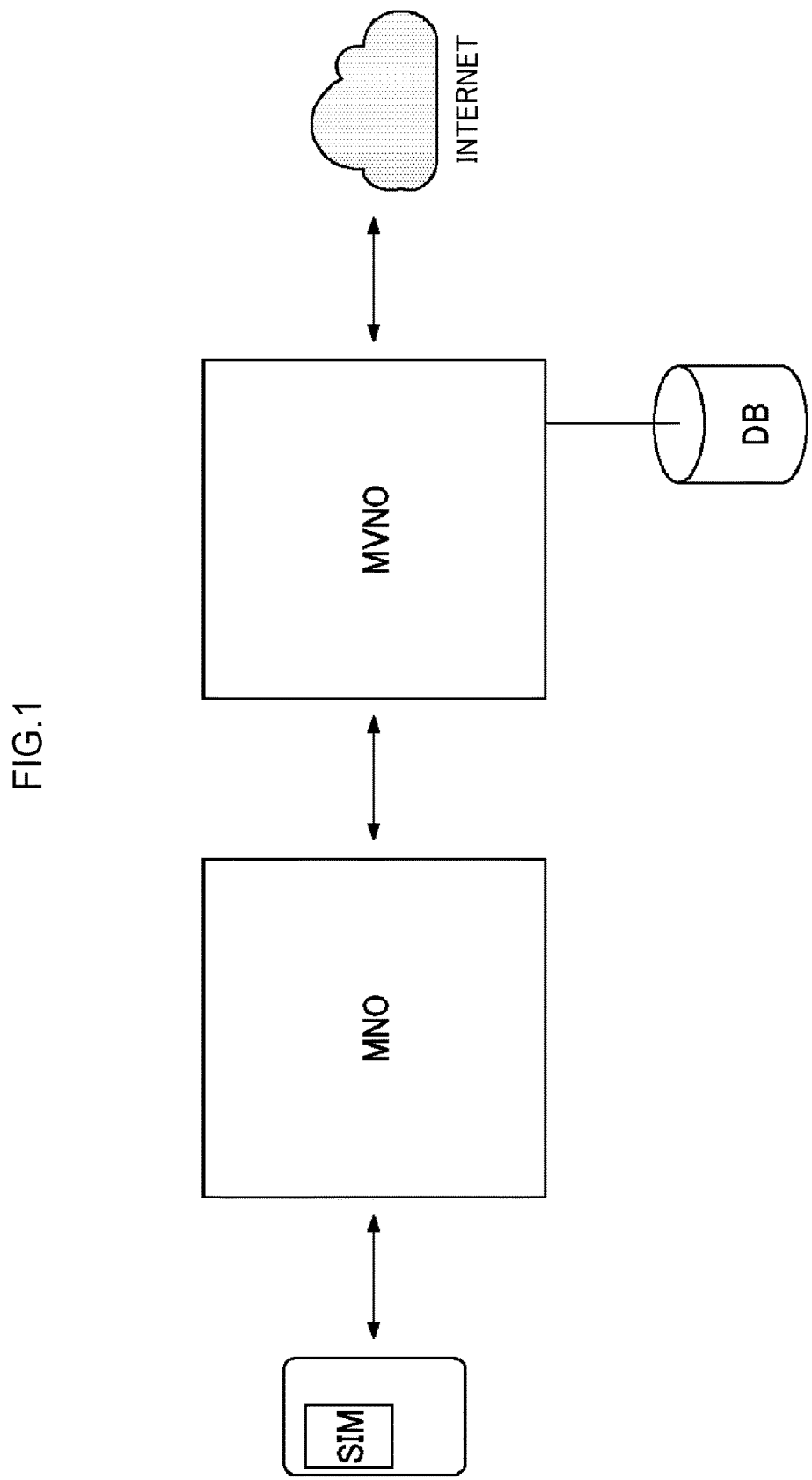
FIG. 1 is a schematic diagram illustrating an MVNO whose communication infrastructure is connected to a communication infrastructure of an MNO to provide a wireless communication service.
Figure 2:
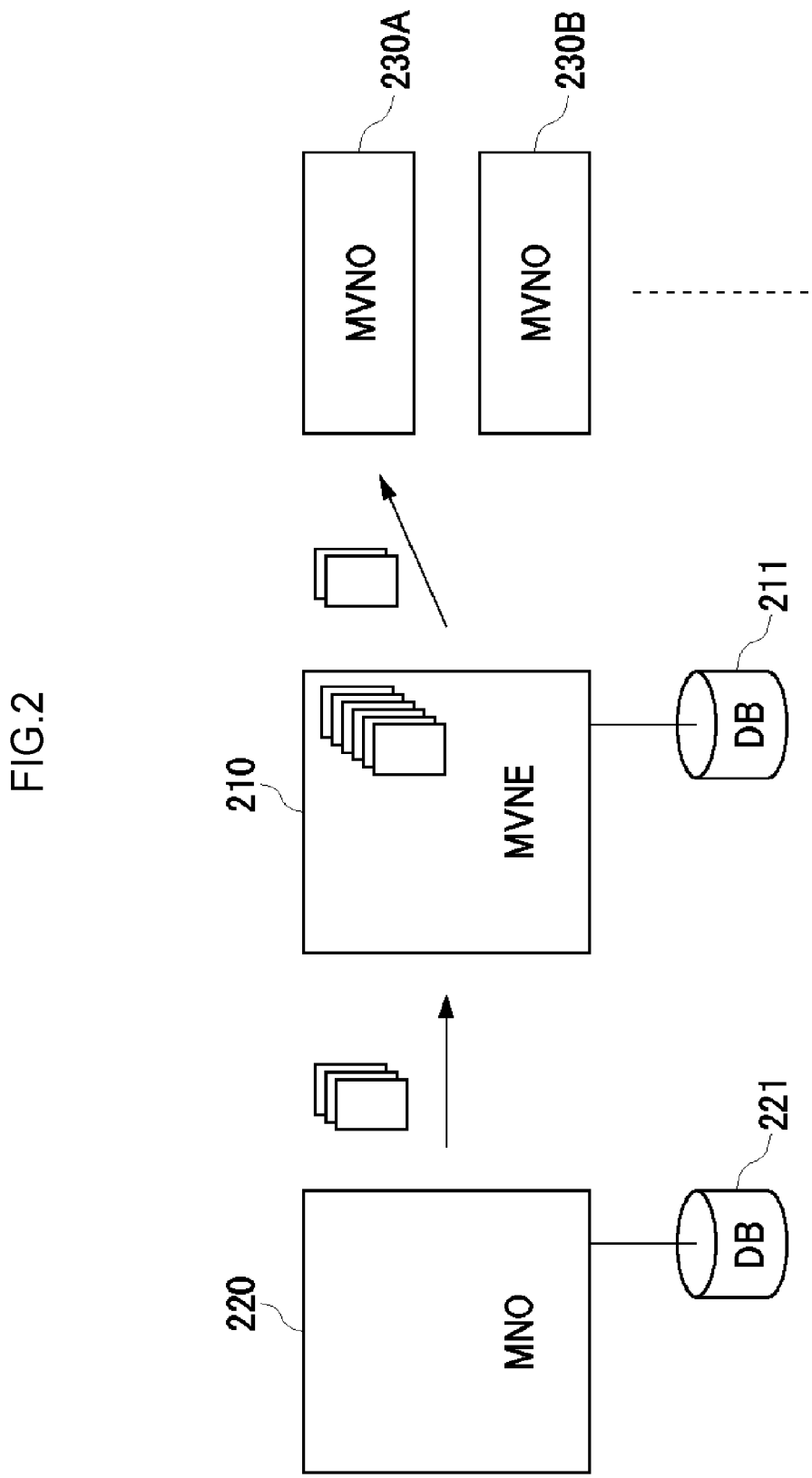
FIG. 2 is a diagram illustrating a circulation route of a plurality of SIM cards enabled by an embodiment of the present invention.

FIG. 2 illustrates a circulation route of a plurality of SIM cards enabled by an embodiment of the present invention.

First, when an MVNE 210 makes a request to an MNO 220 for a certain amount of SIM cards, the MNO 220 inputs the name of the MVNE 210, an identification number of each SIM card, status such as in-use and inactive, etc. to each SIM card manually by a dedicated device, and makes registration to a database 221 of the MNO 220, and then provides the SIM cards to the MVNE 210 by a method such as mailing. By pooling a large amount of registered SIM cards in advance at the MVNE 210, one or more SIM cards can be rapidly supplied to a plurality of MVNOs 230A and 230B that are users. This is a business model where the MVNE 210 holds the SIM cards for the plurality of MVNOs 230A and 230B as shared resources in order to provide necessary amount of SIM cards when necessary and allocates them on demand.

Circulation routes for obtaining the SIM cards for the MVNOs 230A and 230B can be roughly classified into the case in which the SIM cards are received directly from the MVNE 210 and the case in which the SIM cards are received indirectly via a retail channel such as an e-commerce site and a mass merchandiser market. As described below, according to an embodiment of the present invention utilizing a user ID, the SIM cards for the MVNOs 230A and 230B can be circulated using the retail channel and it will be possible to meet the needs of a user who desires to use the SIM cards in an environment in which the SIM cards necessary for IoT apparatuses can be collectively managed as necessary. Particularly, this greatly promotes generation of a large number of small-scale and medium-scale MVNOs that are expected to be needed in future.

The order can be changed, but the MVNE 210 receives user data such as a name, a domicile or residence, a card number or account number for payment, etc. from each of the MVNOs 230A and 230B to make a contract, and then provides a user ID to each of the MVNOs 230A and 230B in advance. The user data is stored in a management server MVNE 210 or a database 211 accessible therefrom. This status is defined as "under MVNO contract". The MVNE 210 can provide a management screen on the management server for each of the MVNOs 230A and 230B. The contract with the MNO 220 is made by the MVNE 210. For this reason, depending on a decision of the MVNE 210, if a user who desires to become an MVNO satisfies a minimum condition looser than the contract with the MNO, the user can perform collective management of a plurality of SIM cards as an MVNO.

Figure 3:
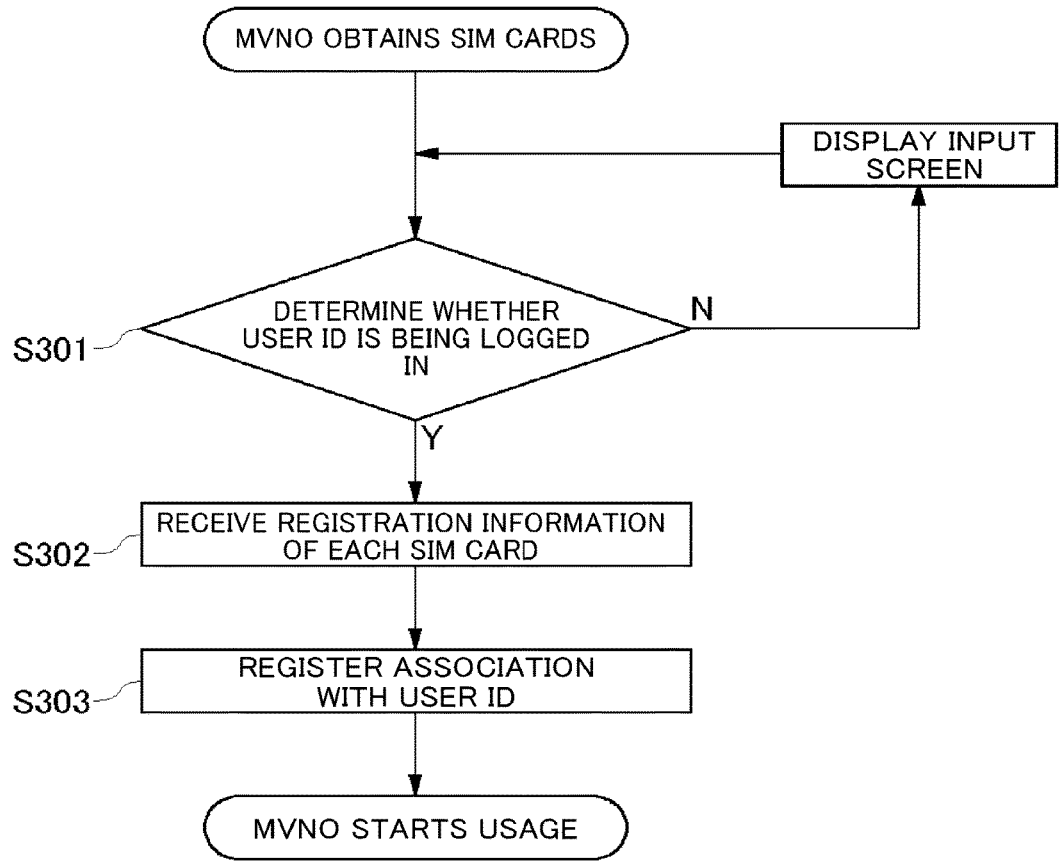
FIG. 3 is a diagram illustrating an initial setting method for using a plurality of
SIM cards according to an embodiment of the present invention.

Here, an initial setting method for using a plurality of SIM cards according to the embodiment of the present invention utilizing a user ID will be described with reference to FIG. 3. The description starts from a situation where the MVNO 230A has received one or more SIM cards. At this time, the MVNO 230A may have SIM cards that are already in use, or it may be in a situation where it is going to start using for the first time by the received SIM cards.

First, the MVNO 230A that has obtained one or more SIM cards logs in to a management screen provided by the MVNE 210 in association with the user ID of the MVNO 230A. From the side of the MVNE 210, it determines whether the user ID of the user who has accessed the management screen of the management server of the MVNE 210 is under MVNO contract (S301).

When the user ID is under MVNO contract and the login is performed, an identification number given to each SIM card and a passcode for authentication given as needed are received as registration information (S302).

If the management server of the MVNE 210 can receive the necessary registration information, each SIM card of which the identification number is specified by the registration information is associated with the user ID as the SIM card used by the MVNO 230A and the association is registered in the management server of the MVNE 210 or the database 221 accessible therefrom (S303).

Figure 4:
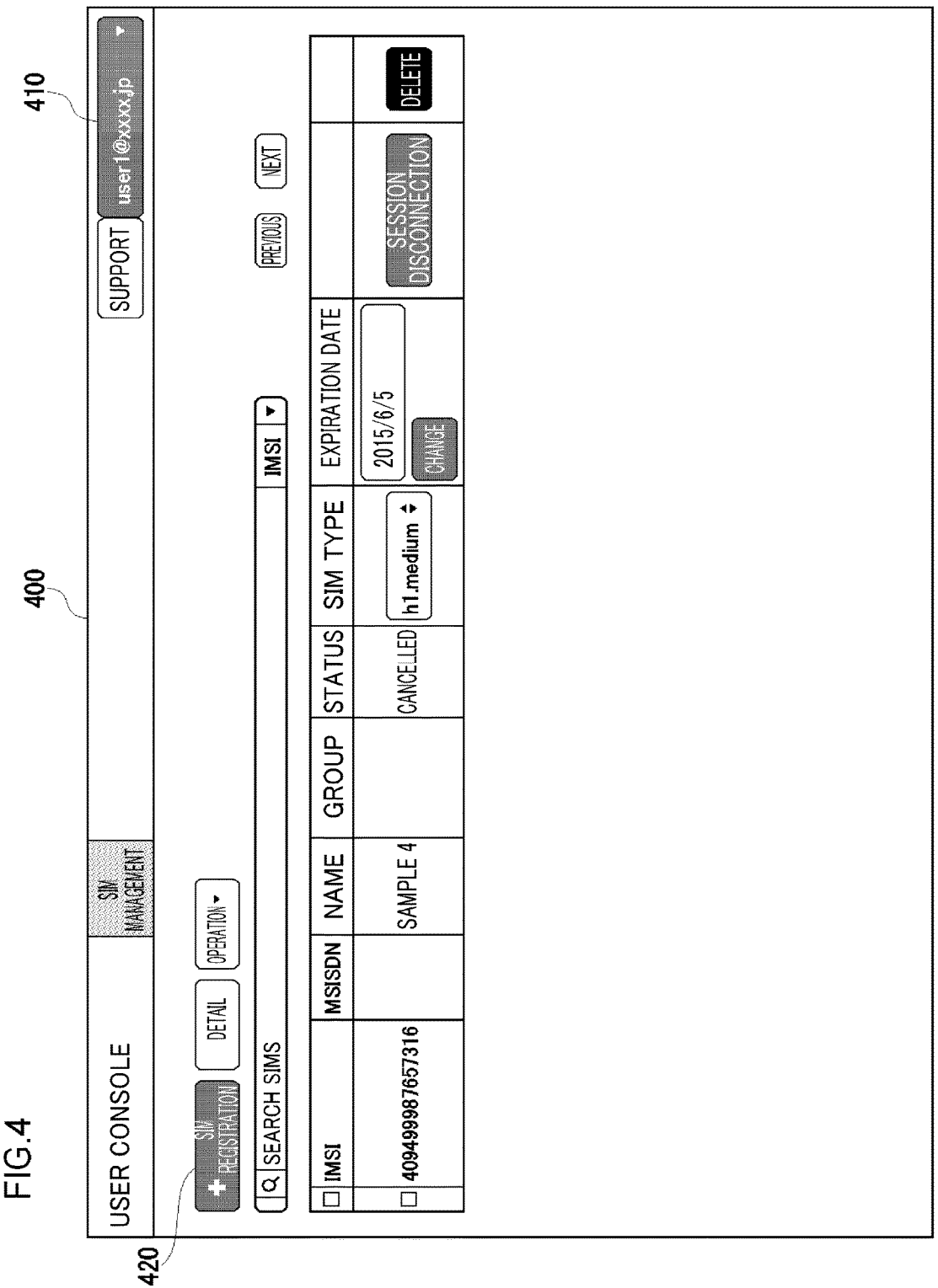
FIG. 4 is a diagram illustrating a management screen of a plurality of SIM cards according to an embodiment of the present invention.

For example, a management screen 400 illustrated in FIG. 4 can be used. A "SIM registration" button 420 is clicked or tapped after performing the login using a user ID (for example, "user1 @xxxxjp") 410, and an input screen to input necessary input items as illustrated in FIG. 5 can be displayed in response to the detection of the click or tap. It is possible to identify the necessary input items by photographing and uploading a physical medium where the identification number, etc. of each SIM card is described as an image and performing an image analysis at the side of the management server of the MVNE 210 where the image is received. The passcode given to each SIM card can be set as a one-time password that becomes invalid when the passcode is once associated with the user ID.

The description has been given on the assumption that the management screen is provided on the management server of the MVNE 210. However, the management screen can be displayed within an application operated on a wireless terminal such as a smart phone and a tablet.

The SIM card associated with the user ID may be displayed continuously on the management screen after association with the user ID.

Conventionally, SIM cards could not be supplied to the MVNO unless the MVNO goes through a series of complicated procedures with the MNO. However, according to the embodiment of the present invention utilizing the user ID, the MVNO to which SIM cards are provided can associate the SIM cards with an account (user ID) of the MVNO afterwards. Therefore, the SIM cards can be circulated in a state without association with the account of the MVNO.

The fact that it is possible to circulate SIM cards without specifying the MVNO using the SIM cards means that the SIM cards can be supplied to the MVNO via a retail channel such as an e-commerce site and a mass merchandiser market and plays a major role in supplying SIM cards to a large number of small-scale and medium-scale MVNOs to be born from now on.

In a current situation, the individual SIM cards can be purchased via the retail channel such as the e-commerce site and the mass merchandiser market. However, it shall be noted that all of the SIM cards need to be individually managed and collective management of a plurality of SIM cards such as several to several tens of SIM cards is not possible.

The management server according to the embodiment of the present invention includes a processing unit such as a CPU and a storage unit. Programs stored in the storage unit are read and are executed by the processing unit, so that the individual functions of the management method can be realized, and the management server can be configured.

Second Embodiment

In the first embodiment, the example of the case in which necessary registration information is input by clicking an "SIM registration" button 420 of a management screen 400 is described. Alternatively, registration information can be sent together with one or more SIM cards received by an MVNO 230A in a form of a QR code (registered trademark) for example and the MVNO 230A can read the registration information and associate the received SIM cards with the user ID. This is effective to the case of one SIM card. However, in the case of a plurality of SIM cards, association with the user ID becomes significantly easy.

Specifically, first, a management server of an MVNE 210 allocates a group ID (for example, "group123456789") not associated with a specific user ID to a set of SIM cards including one or more SIM cards. The management server of the MVNE 210 holds a correspondence table showing a correspondence relation of a group ID and identification numbers of a set of SIM cards to which the group ID is allocated, for each group ID.

Next, the management server of the MVNE 210 generates a registration code such as a barcode, a QR code (registered trademark), and URL representing registration information including the group ID and a passcode for authentication given as needed. The passcode or the registration information including the passcode can be set as a hash value. The registration information or the registration code can be stored in the management server or a storage medium accessible from the management server in association with the group ID. The URL can be set as URL including a group ID and a necessary passcode or a hash value thereof and can include a portion showing the management server of the MVNE 210 and a portion showing the group ID and the necessary passcode or the hash value thereof (for example: "https://www.soracom.io/group123456789/").

The MVNO 230A that receives the registration code can receive the registration code in an application operated on a wireless terminal for example and can input the registration information represented by the registration code to the management server of the MVNE 210. When the registration code is a URL, the registration information can be input to the management server of the MVNE 210 by accessing the URL corresponding to the registration code, such as a web page uniquely determined for each group ID. That is, if the management server of the MVNE 210 receives the registration information, in the case in which a user ID is under MVNO contract and login is performed, identification numbers of the SIM cards to which the group ID included in the registration information is allocated can be specified by referring to the correspondence table. Association of one set of SIM cards with the user ID can be performed without requiring an additional input of the user after obtaining the group ID from the registration information. The passcode corresponding to each group ID can be set as a one-time password which becomes invalid when the SIM cards to which the group ID is allocated are once associated with a user ID.

Conventionally, the user data needed to be registered for each SIM card. However, by providing the management method using the group ID, the initial setting of an MVNO which requires a plurality of SIM cards can be markedly simplified.

In the example described above, an example in which the registration code is provided to the MVNO 230A is described. Alternatively, the registration information including the group ID can be directly transmitted.

Further, an input screen to designate a group name of one set of SIM cards to be associated with a user ID can be displayed after, at or before obtaining the group ID from the registration information. In this way, the already registered SIM cards in association with the user ID and newly added SIM cards can be managed separately. When the registration code is a URL, a group name can be included in the registration information by providing a group name by using a URL parameter, instead of the input screen.

For example, in the case in which an IoT apparatus provider is the MVNO 230A, the case where the IoT apparatus provider provides its apparatuses to a plurality of providers by lease contracts can be considered. At this time, it is possible to separately manage a wireless communication service provided from the IoT apparatus provider as the MVNO to each provider by giving a group name to each provider.

When the MVNO 230A is specified at the MVNE 210, the registration code or the registration information may be transmitted digitally to the MVNO 230A and the SIM cards may be delivered separately. Here, if the case in which the IoT apparatus provider is the MVNO 230A is considered as an example again, the registration code or the registration information may be transmitted to the IoT apparatus provider to perform the association with the user ID, and the SIM cards may be dispatched to the entity to whom the IoT apparatuses are provided from the IoT apparatus provider.

Third Embodiment

In the first and second embodiments, description is given on the assumption that a management server of an MVNE 210 is configured using one or more servers. However, the management server can be configured as an instance on a cloud.

More specifically, (at least a part of) a gateway to cause data from a wireless terminal to pass through to an IP network and the like held by the MVNE 210 may be implemented on a cloud and the gateway or the instance on a cloud accessible therefrom may perform functions of the above mentioned management server.

In the present specification, the "cloud" means a system that can dynamically perform provisioning and provide computing resources such as a CPU, a memory, a storage, and a network band according to a demand on the network. For example, by AWS, etc., a cloud can be used.

In the gateway, controls such as speed limit, capacity limit and time slot limit for the wireless terminal are possible. For this reason, communication quality, communication status, etc. of one or more SIM cards to be associated with a user ID can be changed on a management screen.

Figure 6:
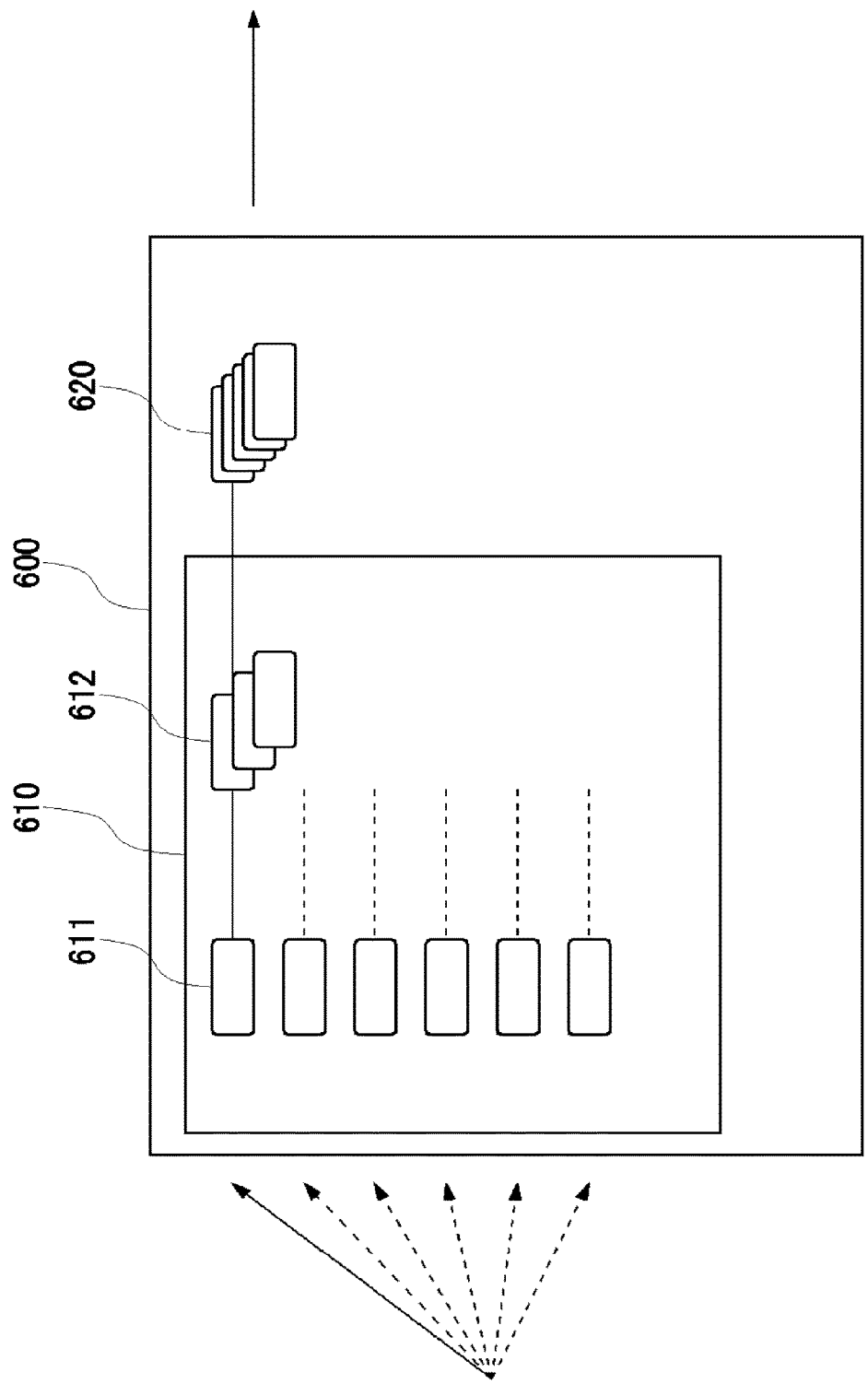
FIG. 6 is a diagram illustrating an example of a gateway on a cloud executing a function of a management server according to an embodiment of the present invention.

Executing such processing at the gateway necessarily causes reduction in the number of simultaneously connectable apparatuses required for the gateway by the physical limit of the server which the gateway is implemented. In addition, the number of gateways by which the MVNE 210 can make L2 connection (or L3 connection) with the communication infrastructure of an MNO 220 is in most cases predetermined by the MNO 220 and a number limit is imposed. For this reason, even if a cost is disregarded, it is not possible to accept the increase in the number of simultaneously connectable apparatuses by adding hardware more than the number limit. Therefore, as illustrated in FIG. 6, at a gateway 610 comprising a communication system 600, a first server group 611 which is a portion connected to a communication infrastructure of the MNO 220 and a second server group 612 which is a portion to perform additional data processing and the like are divided and a function of the management server is performed at the second server group 612 or a server group 620 accessible therefrom to avoid the occupation of computing resources which suppresses the increase in the number of simultaneously connectable apparatuses at the gateway 610 even when an additional data processing at the gateway 610 is added, and rich functions and complicated functions can be implemented at the gateway 610.

Both of the first server group 611 and the second server group 612 may be on a cloud. Particularly, by realizing each server configuring the second server group 612 as an instance on a cloud, it can be scaled out by increasing the number of instances as needed. Therefore, computing resources can be used substantially unlimitedly.

Figure 7:
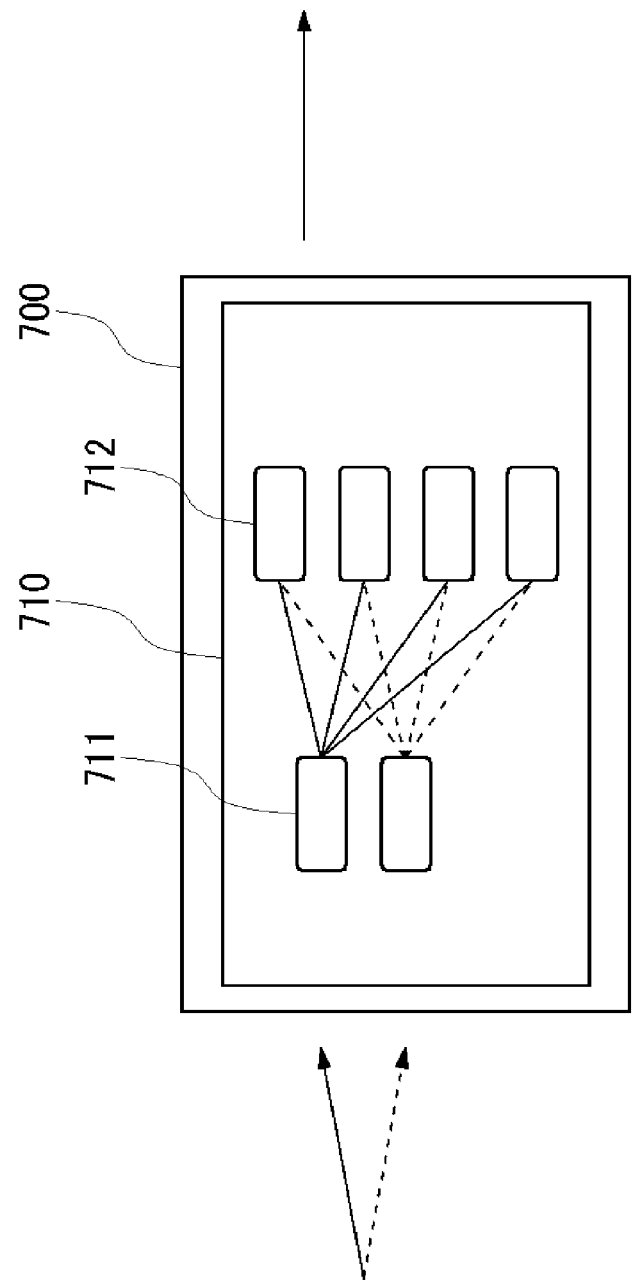
FIG. 7 is a diagram illustrating another example of a gateway on a cloud executing a function of a management server according to an embodiment of the present invention.

As in an example of a gateway 710 illustrated in FIG. 7, the number of servers configuring a second server group 712 is preferably larger than the number of servers configuring a first server group 711. When the number of servers configuring the second server group 712 is equal to or smaller than the number of servers configuring the first server group 711, resources such as the number of sessions and the number of IP flows determined by the number of servers or instances are not increased and sufficient scalability may not be obtained. FIG. 7 illustrates the case in which the second server group 712 is commonly used by each server of the first server group 711. However, the present invention is not limited to this example. Here, an example of the case in which the function of the management server is performed at the second server group 712 is considered.

Further, each server configuring the first server group 611 can be realized as an instance on a cloud. In this way, an IP address of each server can be virtualized and failure resistance can be improved. Even if a certain server goes down, by holding a correspondence relation of the first server group 611 and the second server group 612 in a newest state in real time on a database of the third server group 620 for example, failure recovery is enabled instantly by changing IP addresses to different servers. Also, because scaling up and scaling down can be performed freely by using cloud, instances having optimal CPU, memory, storage, and network band according to processing load can be selected. As a result, hardware adjusted to the maximum demand at the peak does not need to be always prepared and optimization of the cost is enabled. This is applicable to cloud migration of the second server group 612.

From the MNO 220 to the MVNE 210, IP addresses of the first server group 611 are registered in advance in a database of the MNO 220 and for example it can be determined in a round robin manner to which server of the first server group 611 the data from a wireless terminal is transmitted. Other than IP addresses, registered information may be destination addresses to identify destinations, such as MAC addresses.

Each server configuring the first server group 611 has a receiving unit that receives data from a wireless terminal, a selecting unit that selects any one of a plurality of destination addresses on the basis of a header of the received data, and a transferring unit that transfers the received data to the destination address selected by the selecting unit.

Transfer of the data from the wireless terminal, that is, a packet including a payload and a header from the first server group 611 to the second server group 612 can be performed by rewriting an IP address designated by the header added to the payload received from the wireless terminal at the first server group 611 with any one of the plurality of IP addresses corresponding to the second server group 612. Each of the first server group 611 transfers the data to the server configuring the second server group 612 that after rewriting corresponds to one of the plurality of IP addresses. Rewriting is an example of processing necessary when an IP address to transfer the data received by each of the first server group 611 to the server configuring the second server group 612 is selected and the data can be transferred by performing other tunneling (IPIP, GRE, IPsec, GTP, etc.).

At the third server group 620, the number of servers configuring the second server group 612 can be controlled on the basis of metrics of processing capabilities and scaling-out and scaling-in can be performed. The third server group 620 can monitor metrics of processing capabilities of instances used by the first server group 611 and the second server group 612 and can allocate connection to instances having low processing load every time there is a connection request from the wireless terminal. As examples of the monitored metrics, there are a CPU load, a memory utilization rate, disk read, disk write, a network traffic reception amount, and a network traffic transmission amount.

In addition, a correspondence relation of the first server group 611 and the second server group 612 can be selected using the third server group 620. When the first server group 611 receives a GTP connection start request (GTP-C) including IMSI, TEID, etc. of the wireless terminal, the first server group 611 transmits a CreateSession message to the third server group 620 and the third server group 620 receiving the message can select the second server group 612 as the destination on the basis of the metrics of the processing capabilities generated by continuously or intermittently monitoring a utilization situation of the CPU, the memory, the storage, and the network traffic of the computing resources of the second server group 612. By recording a correspondence of an identifier of an L2 tunnel, an identification number of the wireless terminal, IP addresses of the first server group 611, IP addresses of the second server group 612 at the third server group 620 when there is the GTP connection start request, a session of the L2 tunnel can be recovered when a failure occurs in the first server group 611 or the second server group 612.

The connection start request can be received at the first server group 611 and the first server group 611 can perform a function on a C plane. However, a C plane server group performing the function on the C plane can be separately provided as a part of the gateway 610 or a part of the communication system 600. In this way, the computing resources of the first server group 611 can be used for simultaneous connection with more apparatuses. In this case, the first server group 611 does not receive the connection start request and does not have the function on the C plane.

As examples of the additional data processing at the gateway, an alert can be generated in response to a communication situation of one set of SIM cards to which a group ID is allocated for example. It is possible to output an alert or adjust the communication band when a predetermined communication amount set by a contract of the SIM cards is exceeded by monitoring the communication situation using each SIM card.

As examples of an IP network accessed by the wireless terminal, there is a private system in addition to the Internet. The private system includes an on-premise private system, a different IP network on the same cloud or an IP network on the different cloud when at least a part of the gateway 610 is realized on a cloud. The communication system 600 or the gateway 610 and these private systems can be connected by a dedicated line or a virtual dedicated line.

Fourth Embodiment

FIG. 8 illustrates a setting change screen 800 of a plurality of SIM cards according to an embodiment of the present invention. When an MVNO 230A who is a user of SIM cards makes access to a web page on a management server of an MVNE 210 or on a server accessible to information stored in the management server, the management screen 800 of the plurality of SIM cards of which the MVNO 230A is the user can browsed.

In addition to an identification number 801 given to each SIM card, a name 802, a group name 803, utilization status 804, a type 805 of communication quality given to the SIM card, an expiration date 806, etc. are displayed.

Here, the type 805 of the communication quality can be selected by a click and the like and set speed limit, capacity limit, time slot limit, etc. can be changed as needed. The changed communication quality is stored at the management server together with the identification number of the SIM card.

When there are more than two groups 803, a search specifying a group can be performed by selecting the group by pull-down 900 to select a search condition placed on the right side of the search window of FIG. 9. If the group is designated and the search is performed, a list of SIM cards associated with the group is displayed as illustrated in FIG. 8, in this case "test group 1". Therefore, the setting can be collectively changed by checking the left check box and appropriately selecting from the "operation" for example.

For example, if the list of SIM cards associated with the "test group 1" is displayed and the group is changed to "test group 3", a transition of SIM registration between the groups is easily made.

After one or more SIM cards and a user ID are associated with each other, the management can be started by setting the communication status 804 to "inactive". By setting the communication status to inactive, generation of communication charges can be suppressed until communication is actually necessary.

In the case in which the MVNO 230A is specified at the MVNE 210 and a registration code or registration information is transmitted digitally to the MVNO 230A and the SIM cards are delivered separately, when the SIM cards are dispatched, the communication status 804 can be set to "dispatching". It can be changed to "in-use" when the MVNO 230A inputs the registration information for example by inputting the registration code. Alternatively, when a predetermined date and time or a predetermined period passes, the communication status can be changed to "in-use".

Fifth Embodiment

If the case in which an IoT apparatus provider is an MVNO 230A described in the first embodiment is used as an example again, the case in which an IoT apparatus leased from the IoT apparatus provider is assigned can be considered. In this case, a user of SIM cards mounted on the IoT apparatus also changes from a first MVNO to a second MVNO. In a management server of an MVNE 210, this change can be reflected.

The first MVNO that desires to change the user of one or more SIM cards it has been using by assignment, re-renting, etc. first sends a change application of the user to the MVNE 210. After receiving the change application, the MVNE 210 generates registration information including a passcode or a registration code representing the registration information. At this time, the management server of the MVNE 210 can change the communication status 804 of the SIM cards targeted by the change application to "inactive" and it is possible not to display these SIM cards on a management screen 800 of the first MVNO.

The first MVNO receives the registration code or the registration information generated by the MVNE 210 and provides the registration code or the registration information to the second MVNO, together with an apparatus in some cases. The second MVNO inputs the received registration code or registration information to the management server of the MVNE 210, similar to the first embodiment or the second embodiment, so that the SIM cards can be associated with a user ID of the second MVNO.

In this way, giving and receiving of SIM cards between MVNOs, that is, the change of user ID can be performed easily and securely, and for example assigning and re-renting of the IoT apparatuses can be easily performed.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A management method for using a plurality of SIM cards, comprising steps of:
    receiving registration information for registering one or more SIM cards; and
    associating one or more SIM cards, one or more identification numbers of which are specified by the received registration information, with a user ID of a user of the plurality of SIM cards,
    wherein communication status for each identification number is changeable on a management screen provided for the user ID,
    wherein communication quality for each identification number is at least one of speed limit, capacity limit and time slot limit and changeable on the management screen, and
    wherein management of the communication quality is performed on an instance on a cloud.

2. The management method according to claim 1, wherein management of the communication status for each identification number is started as inactive.

3. The management method according to claim 1, wherein the communication status is changeable by selecting from at least more than two of inactive, in-use, cancelled, and dispatching.

4. The management method according to claim 3, wherein management of the communication status is performed on an instance on a cloud.

5. The management method according to claim 1, comprising the steps of:
    receiving a change application of a user of one or more SIM cards associated with the user ID; and
    generating registration information for one or more SIM cards which are targeted by the change application in response to the change application.

6. The management method according to claim 5, wherein communication status of one or more SIM cards which are targeted by the change application is changed in response to receiving the change application.

7. The management method according to claim 1,
    wherein the registration information includes one or more identification numbers of the one or more SIM cards;
    wherein the step of receiving the registration information comprises the steps of
    detecting a click or tap of a registration button on a management screen provided for the user ID;
    displaying an input screen for registering the one or more SIM cards in response to detection; and
    associating the one or more SIM cards, one or more identification numbers of which are input on the input screen, with the user ID.

8. A non-transitory computer-readable program storage medium, storing a program for having a computer perform a management method for using a plurality of SIM cards, the management method comprising steps of:
    receiving registration information for registering one or more SIM cards; and
    associating one or more SIM cards, one or more identification numbers of which are specified by the received registration information, with a user ID of a user of the plurality of SIM cards,
    wherein communication status for each identification number is changeable on a management screen provided for the user ID,
    wherein communication quality for each identification number is at least one of speed limit, capacity limit and time slot limit and changeable on the management screen, and
    wherein management of the communication quality is performed on an instance on a cloud.

9. A management server for using a plurality of SIM cards, comprising:
    a receiving unit for receiving registration information for registering one or more SIM cards; and
    an associating unit for associating one or more SIM cards, one or more identification numbers of which are specified by the received registration information, with a user ID of a user of the plurality of SIM cards,
    wherein communication status for each identification number is changeable on a management screen provided for the user ID,
    wherein communication quality for each identification number is at least one of speed limit, capacity limit and time slot limit and changeable on the management screen, and
    wherein management of the communication quality is performed on an instance on a cloud.

* * * * *